(12) United States Patent
Suzuki

(10) Patent No.: US 7,703,802 B2
(45) Date of Patent: Apr. 27, 2010

(54) AIR BAG AND FOLDING METHOD THEREFOR

(75) Inventor: Hidenobu Suzuki, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 245 days.

(21) Appl. No.: 11/197,349

(22) Filed: Aug. 5, 2005

(65) Prior Publication Data

US 2006/0119088 A1   Jun. 8, 2006

(30) Foreign Application Priority Data

Aug. 5, 2004   (JP)   .............................. 2004-228909

(51) Int. Cl.
*B60R 21/237* (2006.01)
(52) U.S. Cl. .................................................. 280/743.1
(58) Field of Classification Search ............... 280/743.1
See application file for complete search history.

(56) References Cited

U.S. PATENT DOCUMENTS 5,140,799 A    8/1992    Satoh

| | | |
|---|---|---|
| 5,425,551 A | 6/1995 | Hawthorn |
| 5,445,414 A * | 8/1995 | Pittman et al. ............ 280/743.1 |
| 5,529,339 A * | 6/1996 | Niederman ............... 280/743.1 |
| 6,206,409 B1 * | 3/2001 | Kato et al. ................ 280/728.2 |
| 6,244,624 B1 | 6/2001 | Kumagai |
| 6,471,238 B2 * | 10/2002 | Ishikawa et al. .......... 280/728.3 |
| 6,547,279 B1 * | 4/2003 | Amamori .................. 280/743.1 |
| 6,832,779 B2 * | 12/2004 | Tajima et al. ............. 280/743.1 |
| 6,918,868 B2 * | 7/2005 | Vitet ........................... 493/457 |
| 7,150,470 B2 * | 12/2006 | Okada et al. .............. 280/743.1 |

FOREIGN PATENT DOCUMENTS

JP   5-305852 A   11/1993

\* cited by examiner

*Primary Examiner*—Paul N Dickson
*Assistant Examiner*—Nicole Verley
(74) *Attorney, Agent, or Firm*—Sughrue Mion, PLLC

(57) ABSTRACT

The present invention relates to an air bag that has a gas-introducing hole and is folded and housed in a container and that includes a pair of first zigzag folded portions, the first zigzag folded portions being formed by respectively folding both side portions and collecting them at a center in a lateral direction; and a second zigzag folded portion that is formed by folding zigzag the first zigzag folded portions in a direction that intersects with a folding direction of the first zigzag folded portions.

13 Claims, 5 Drawing Sheets

(1)

(2)

(3)

(4)

AIR BAG AND FOLDING METHOD THEREFOR

BACKGROUND OF THE INVENTION

1. Field of the Invention

This invention relates to an air bag for an air bag device that is to be mounted in a vehicle and more particularly to an air bag for protecting a seat occupant in the case of collision or the like and to a folding method therefor.

2. Description of the Related Art

The air bag device is required to be compact such that it is preferably mounted in a vehicle and that it does not occupy a large space. Furthermore, various contrivances are carried out for more preferable deployment characteristics and, for example, for making it have a deployment characteristic that is directed obliquely downwardly. Due to them, there were a tendency toward the increase of the folding operation steps and a tendency toward the increase in difficulty for an operator since the operation steps themselves are complicated.

Furthermore, there is a contrivance to obtain preferable deployment characteristics to a seat occupant having a different seating posture by adding parts such as tether belt, for the above-mentioned more preferable deployment characteristics.

Thus, there was caused a result of increasing the price of the air bag device, due to much labor in the folding operation and the cost of the parts to be added and the cost for attaching them.

One example of known air bag folding methods is disclosed in Japanese Patent Laid-open Publication 5-305852. The air bag device disclosed in the publication is equipped with a folded bag, an inflator for supplying gas into the bag, and a case for accommodating the bag and the inflator, and a hinged door on the opening side of the case. The folding steps of the bag include the steps of folding the bag flat so that exhaust holes on side portions of the bag are on imaginary folding lines; folding the bag in a rectangular form to have a width corresponding to the width of the opening portion of the case by folding back the both end portions of the bag folded flat; folding the bag zigzag toward the opening portion side in a manner to set as a tip an end peripheral portion of the bag that is opposite to the opening portion of the case; storing the entirety of the bag in the case in a condition in which the zigzag folded portion is positioned on an inner side and its periphery is surrounded.

In the above-mentioned folding steps, however, the bag is folded zigzag, and at last a roll folding is conducted to cover the zigzag folded bag portion. Such roll folded portion follows a rewinding process upon the deployment. Therefore, there is a tendency to have some deployment time. To suppress the tendency, for example, there is a method of increasing the output of the inflator. This, however, rapidly increases the inner pressure of the bag upon the start of the deployment. Thus, it may be necessary to provide the bag with a sufficient reinforced structure. Such reinforced structure makes the packing size of the bag larger, resulting in the increase of the cost. This causes a dilemma.

SUMMARY OF THE INVENTION

A first aspect of the present invention includes steps of folding flat an air bag having a gas-introducing hole; and respectively folding zigzag both sides in a lateral direction and collecting each of right and left portions folded zigzag at a central portion in a lateral direction to be folded in a strip form and to form a first zigzag folded portion. Furthermore, it includes a step of folding zigzag the first zigzag folded portion to form a second zigzag folded portion.

A second aspect of the present invention includes steps of folding flat an air bag having a gas-introducing hole; and respectively folding zigzag both sides in a lateral direction and collecting right and left portions folded zigzag at a central portion in a lateral direction to be spaced from each other by a distance, to be folded in a strip form and to form a first zigzag folded portion. Furthermore, it includes the step of folding zigzag the first zigzag folded portion to form a second zigzag folded portion.

A third aspect of the present invention includes steps of folding flat an air bag having a gas-introducing hole; and respectively folding zigzag both sides in a lateral direction and collecting right and left portions folded zigzag at a central portion in a lateral direction to be spaced from each other by a distance of 100 millimeters to 270 millimeters, to be folded in a strip form and to form a first zigzag folded portion. Furthermore, it includes the step of folding zigzag the first zigzag folded portion to form a second zigzag folded portion.

According to the present invention, in the deployment process of the air bag, the second zigzag folded portion expands precedently and upward. Then, at the stage when the deployment has proceeded somewhat, the deployment of the second zigzag folded portion is suppressed, and right and left ends of the first zigzag folded portions deploy right and left respectively. Therefore, it can deploy so as to have a soft contact against an object that exists in the deployment direction of the air bag.

According to the present invention, it is possible to have a flexion at right and left portions of the first zigzag folded portion that are spaced from each other. Thus, it is possible to achieve a soft deployment.

According to the present invention, even though an object that exists in the deployment direction of the bag has a substantial size, it is possible to achieve a soft deployment by avoiding the object.

DETAILED DESCRIPTION

Firstly, an air bag 1 is explained.

As the base cloth of the air bag 1, there is used a base cloth panel obtained by cutting a cloth prepared by weaving polyamide-based synthetic fiber threads of a fiber thickness of 315 deniers and a number of punches of 62/inch into a predetermined shape.

A plurality of this base cloth panel are laminated together and are woven together at the outer periphery to form an air bag.

Figure 1:
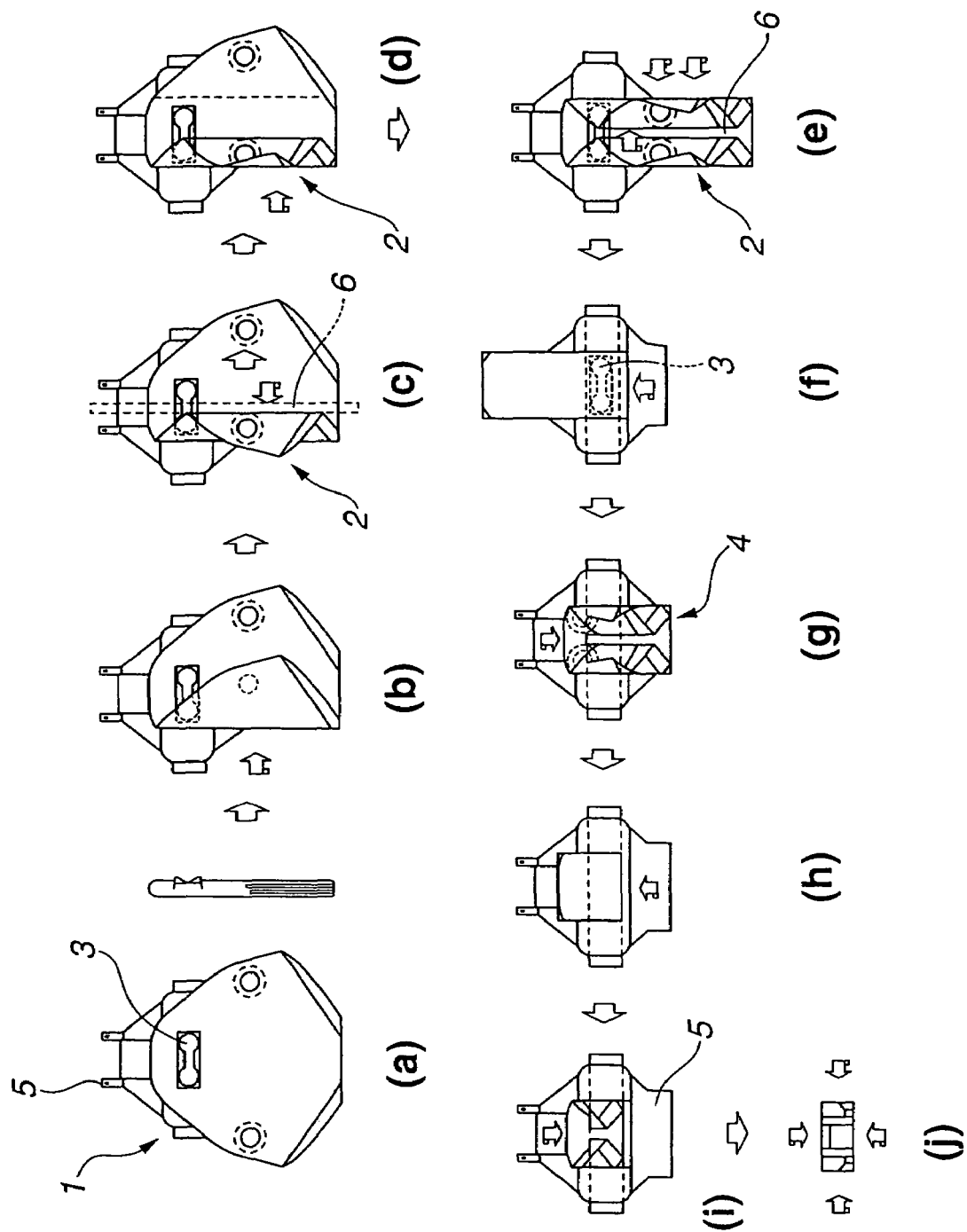
FIGS. 1a thru 1j are explanatory views showing the steps of folding the air bag in accordance with an embodiment of the present invention.

Next, with reference to FIG. 1, the folding steps of the air bag 1 are explained. As shown in FIG. 1a, the air bag 1 is supplied to a folding operation base under a condition that it is extended flat and that a tip end portion of the air bag 1 is put into the inside. Then, right and left portions of the air bag 1 are folded zigzag to make a strip form. In particular, the zigzag portions are formed by respectively folding each of right and left side portions in a lateral direction from a left and right side, respectively, toward a center of the airbag to form a strip elongated in a vertical direction. With this, a pair of first zigzag portions 2 are formed at the right and left of the air bag 1 (FIG. 1b to FIG. 1e).

Herein, the right and left first zigzag folded portions 2 are spaced from each other. By the resulting space 6, the right and left first zigzag folded portions 2 have a relationship in which they are separated from each other. The size of the first folded portion (see FIG. 1b) is set to a size by which it is stored in a receiving can. The number of the zigzag foldings is suitably selected, based on the size of the air bag 1 and the size of the receiving can.

Next, it is folded zigzag from a gas-introducing hole 3 as the starting point to have a size that is somewhat smaller than the size of the receiving can, thereby forming a second zigzag folded portion 4 (see FIG. 1f to FIG. 1i). In other words, the second zigzag folded portion 4 is formed by folding zigzag the pair of left and right first zigzag folded portions 2 in a direction that intersects with, and is substantially perpendicular to, the folding direction of the pair of first zigzag folded portions 2 so that the second zigzag folded portion consists of the entire pair of first zigzag folded portions as clearly shown in FIGS. 1(f) to 1(i). The gas-introducing hole 3 is located at one end of the pair of left and right first zigzag folded portions 2 as shown in FIG. 1(c) to 1(e).

The wrapping member 5 is formed of a cloth having a thickness thinner than that of the cloth constituting the base cloth panel of the air bag 1. A weak portion such as slit (not shown) is formed at a necessary place. Upon the deployment of the air bag 1, this weak portion is firstly broken to deploy the air bag 1. By selecting a thin cloth, the cost is lowered, the packing operation becomes easy, and it is deformed along the shape of the bag to achieve a good fit.

Next, the operation of the air bag 1 of the present embodiment is explained.

Figure 2:
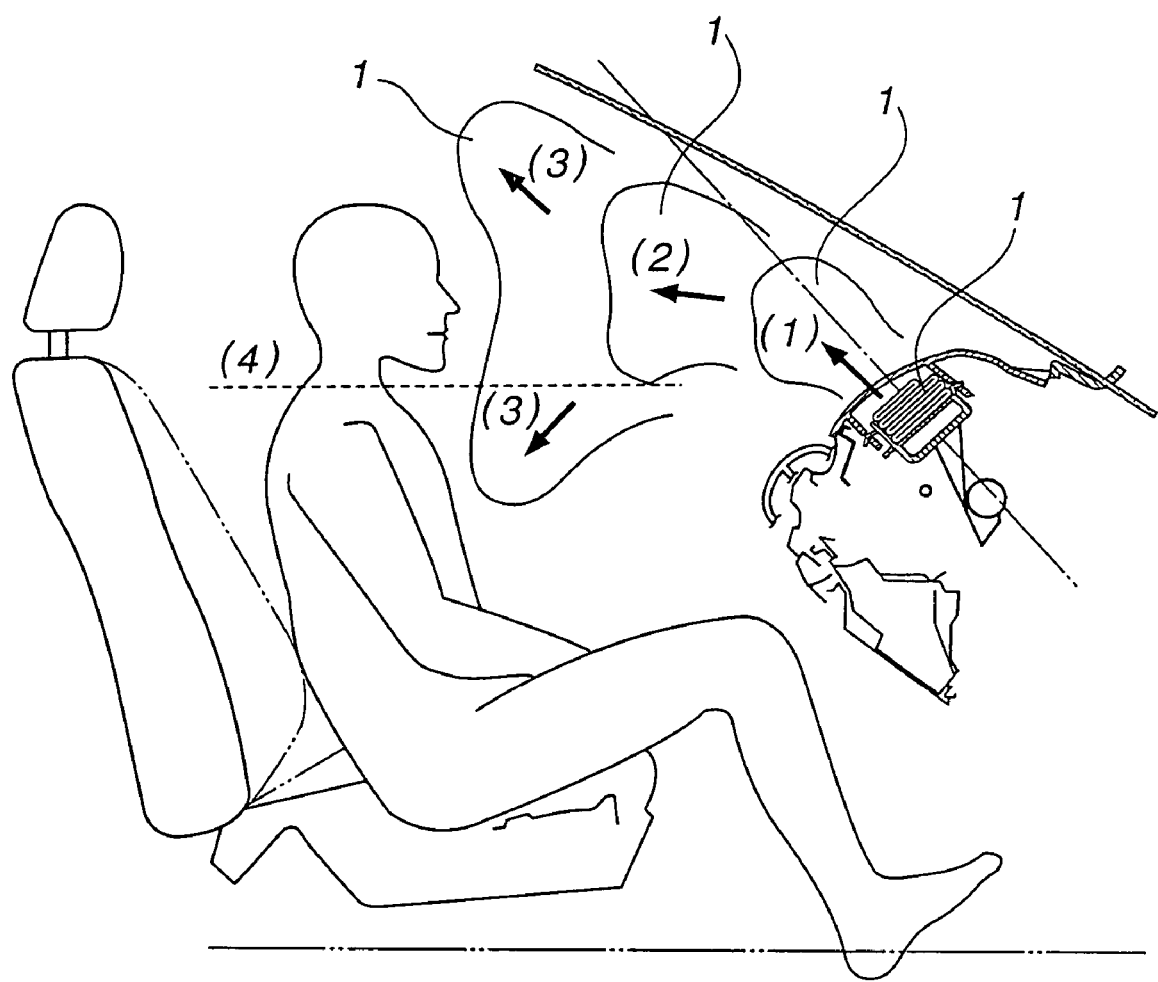
FIG. 2 is an explanatory view showing a deployment process when the air bag folded by the steps of FIG. 1 deploys forward of an object.

As shown in FIG. 2, the deployed air bag 1 deploys in a manner to separate upward and downward, on the basis of the face of a dummy as the object (see reference numerals (1) and (3)). That is, we can say that there is provided a face that is opposite to the face of a dummy.

Figure 3:
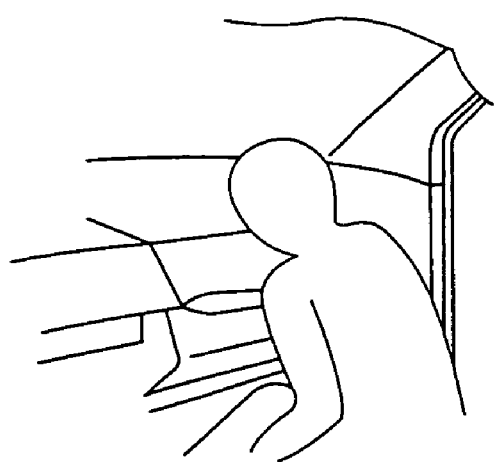
FIG. 3 is an explanatory view showing a deployment process under a condition that an object further approaches an instrument panel having an air bag according to an embodiment of the present invention built therein.
Figure 3:
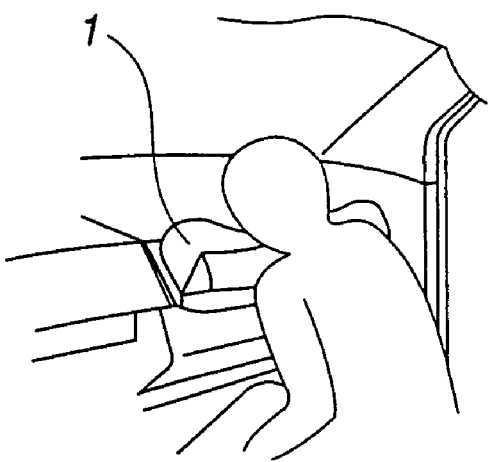
Figure 3:
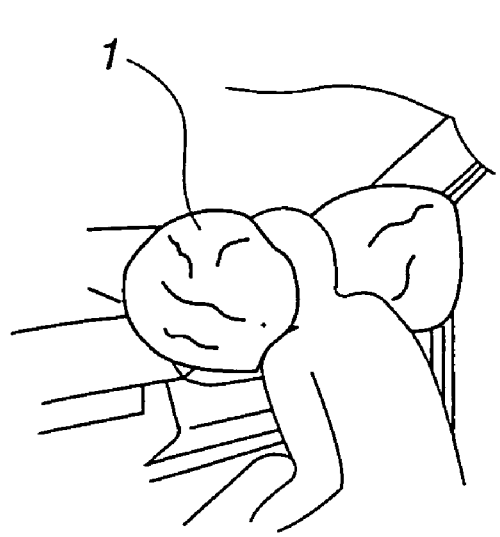
Figure 3:
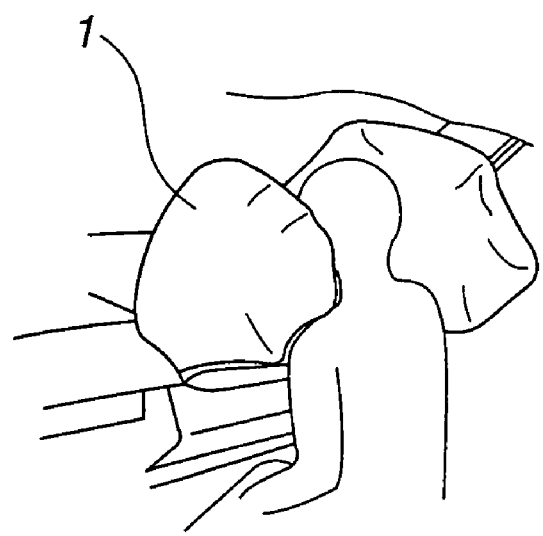
Figure 4:
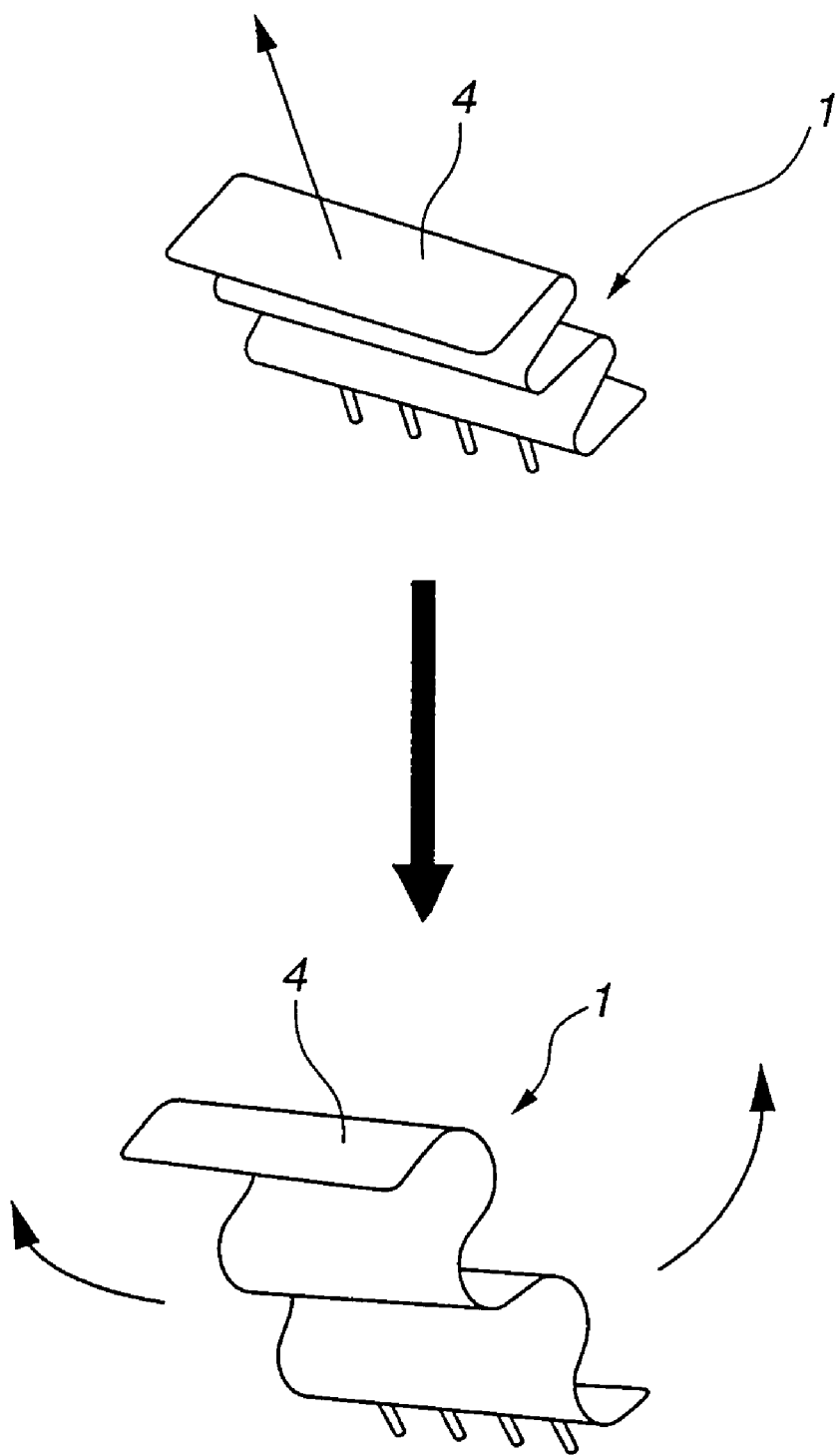
FIG. 4 is a perspective view showing an outline of a second zigzag folded portion of an air bag of the embodiment.
Figure 5:
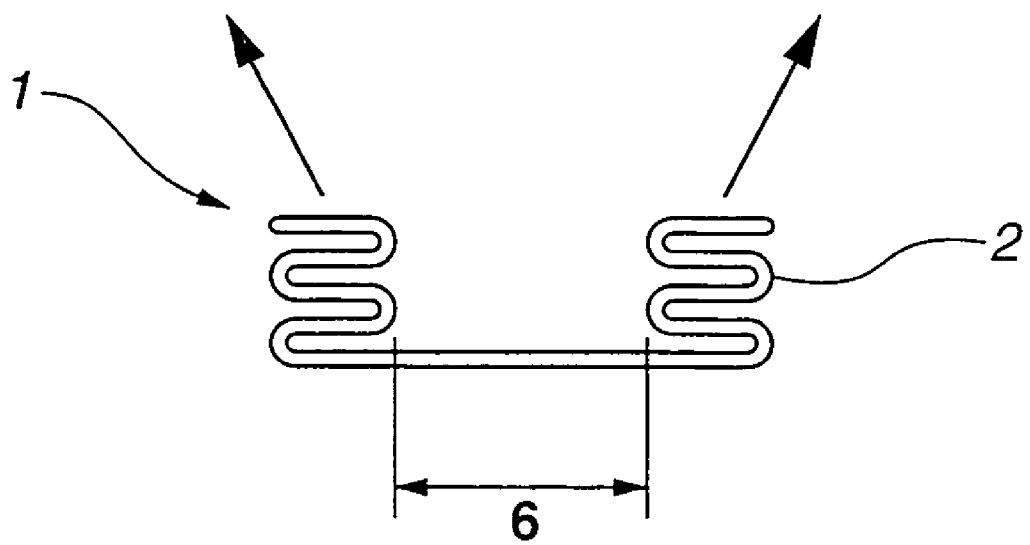
FIG. 5 is a schematic view showing a relationship between a first zigzag folded portion of an air bag of the embodiment and a case.
Figure 5:
Figure 5:
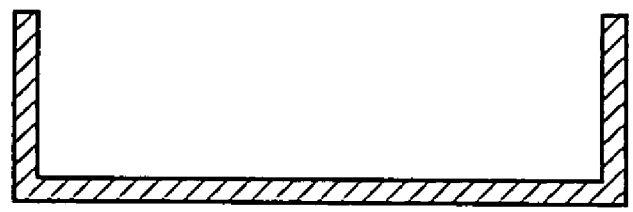

As shown in FIG. 3, when a dummy as the object takes a position close to the instrument panel, the second zigzag folded portion 4 deploys smoothly. Then, the first zigzag folded portions 2 deploy. However, since the space is provided between the right and left first zigzag folded portions 2, gas is smoothly injected from the inflator through the gas introducing hole 3 into the first zigzag folded portions 2, and the first zigzag folded portions 2 deploy rapidly from the sides, even though an upper part of the dummy touches the air bag 1 during the deployment of the second zigzag folded portion 4. With this, it deploys in a manner to substantially avoid the dummy.

The softness of the impact of the air bag that has been determined from a sensor built in the head of the dummy provides a Nij value of about 0.55. Therefore, we can easily understand that it is a preferable softness.

Although the invention was explained by the above embodiment, the present invention is not limited to the above embodiment. A scope obvious from the invention concept disclosed in the specification and the drawings is also included therein. Thus, the invention is defined only by the attached claims.

What is claimed is:

1. An air bag that has a gas-introducing hole and is folded and housed in a container, the air bag comprising:
    a pair of first zigzag folded portions, the first zigzag folded portions being formed by respectively folding each of right and left side portions in a lateral direction from a left and right side, respectively, toward a center of the airbag to form a strip elongated in a longitudinal direction; and
    a second zigzag folded portion that is formed by folding zigzag the pair of first zigzag folded portions in a direction that intersects with, and is substantially perpendicular to, a folding direction of the pair of first zigzag folded portions, so that the second zigzag folded portion consists of the entire pair of first zigzag folded portions,
    wherein a starting point of the second zigzag folded portion is located at the gas introducing hole and the gas introducing hole is located at one end of the first zigzag folded portions.

2. An air bag according to claim 1, wherein the pair of the first zigzag folded portions are spaced from each other by a predetermined distance.

3. An air bag according to claim 1, wherein the pair of the first zigzag folded portions are spaced from each other by a distance of 100 mm to 270 mm.

4. An air bag according to claim 1, wherein the pair of the first zigzag folded portions are spaced from each other by a width that is not shorter than the width of an object that is placed in a deployment direction of the air bag.

5. An airbag according to claim 1, wherein the zigzag folded portions are located on a surface opposite to a surface closer to the container, before the second zigzag folded portion is formed by folding zigzag the first zigzag folded portions, after the first zigzag folded portions are formed.

6. An airbag according to claim 1, wherein the pair of the first zigzag folded portions are spaced from each other by a distance that is adapted to be not shorter than the width of an object that is a target to be protected by the airbag and is placed in a deployment direction of the air bag.

7. An air bag according to claim 1, further comprising a wrapping member wrapping the second zigzag folded portion.

8. A method for folding an air bag having a gas-introducing hole, comprising the steps of:
    (a) placing flat an air bag that is under an unfolded condition;
    (b) forming a pair of first zigzag folded portions by respectively zigzag folding each of right and left side portions in a lateral direction from a left and right side of the airbag, respectively, toward a center of the airbag to form a strip elongated in a longitudinal direction; and
    (c) forming a second zigzag folded portion by folding zigzag the pair of first zigzag folded portions in a direction that intersects with, and that is substantially perpendicular to, the lateral direction, so that the second zigzag folded portion consists of the entire pair of first zigzag folded portions,
    wherein a starting point of the second zigzag folded portion is located at the gas introducing hole, and the gas introducing hole is located at one end of the pair of first zigzag folded portions.

9. A method for folding an air bag according to claim 8, wherein the pair of the first zigzag folded portions are spaced from each other.

10. A method for folding an air bag according to claim 8, wherein the pair of the first zigzag folded portions are spaced from each other by a distance of 100 mm to 270 mm.

11. A method for folding an air bag according to claim 8, wherein the pair of the first zigzag folded portions are spaced from each other by a width that is not less than the width of an object that is placed in a deployment direction of the air bag.

12. The method for folding an airbag according to claim 8, wherein the first zigzag folded portions are located on a surface opposite to a surface closer to the container, before the second zigzag folded portion is formed by folding zigzag the first zigzag folded portions, after the first zigzag folded portions are formed.

13. The method for folding an airbag according to claim 8, wherein the pair of the first zigzag folded portions are spaced from each other by a distance that is adapted to be not shorter than the width of an object that is a target to be protected by the airbag and is placed in a deployment direction of the air bag.

* * * * *